United States Patent Office 3,386,835
Patented June 4, 1968

3,386,835
METHOD OF PREPARING OIL-WATER EMULSIONS
Jacob Arie Schaap, Dordrecht, Netherlands, assignor to Lever Brothers Company, New York, N.Y., a corporation of Maine
No Drawing. Filed May 28, 1964, Ser. No. 371,125
Claims priority, application Great Britain, June 5, 1963, 22,315/63
12 Claims. (Cl. 99—118)

ABSTRACT OF THE DISCLOSURE

This invention provides a process which enables a water-in-oil emulsion to be prepared by means of a proteinaceous emulsifier of the type which is ineffective in markedly acid media. The aqueous phase used initially provides the relatively alkaline media required for effectiveness of the proteinaceous emulsifier; an acidogenic substance in the emulsion acidifies the emulsion for higher microbiological keepability at a sufficiently slow rate to permit the emulsifying agent to produce the emulsion.

---

This invention relates to fatty products especially to margarine and the like which are emulsions of oil and water, and to their preparation.

Margarine can be manufactured by preparing an oil-in-water emulsion by emulsifying oil and an aqueous phase, causing partial or complete solidification of the dispersed oil phase, and if desired adding a further quantity of oil and effecting a substantially complete phase inversion. An important object of this method is to obtain a margarine having improved rheological properties and taste. To achieve this object by the method in question this solidification of the oil phase should take place before the phase inversion, whereas in the more conventional process a water-in-oil emulsion is prepared directly and consequently solidification of the oil occurs in the continuous oil phase.

In the process described above the use of emulsifiers is necessary for the preparation of the oil-in-water emulsion. Suitable emulsifiers for this purpose are, for example, proteins such as those of skimmed milk and sodium caseinate, derived from natural foodstuffs. The emulsifiers, however, cannot be used successfully in a markedly acid medium owing to coagulation of the proteins (for example, the iso-electric point of caseinate lies at a pH of about 4.6), and the preparation of weakly alkaline margarine has the drawback of a decreased microbiological keepability, especially if margarine with a low salt content is prepared.

The present invention makes it possible to use emulsifiers, which do not function well in an acid medium, and still to obtain acceptable final products of desirably low pH.

This object can be attained by preparing the fatty product in the presence of a non-acid reacting but potentially acidic substance, that is one which is readily convertible in situ, for instance by hydrolysis, to a substance of acid reaction. (Hereinafter these non-acid reacting substances will be referred to as "acidogenic" substances.)

The present invention provides a method for the preparation of emulsions of oil and water, containing as emulsifier a protein that is effective only so long as the pH remains above a certain value, wherein during the preparation of the emulsion an acidogenic substance as hereinbefore defined is incorporated, the nature and proportions of that substance being such that the pH of the aqueous phase remains above the said value at least until a stable emulsion has been formed.

Preferably an oil-in-water emulsion is prepared by emulsifying oil in an aqueous phase, causing solidification of components of the oil phase, followed by effecting at least partial phase inversion by mechanical working.

The acidogenic substance must be non-toxic, soluble in aqueous media, and of acceptable flavour, and the acidic substance formed therefrom must also be non-toxic and of acceptable flavour. Suitable acidogenic substances fulfilling these conditions are, for example, estolides such as lactide and glycolide; and lactones, in particular delta-lactones of sugar acids, such as delta-gluconolactone, delta-mannonolactone and delta-glucuronolactone. Anhydrides, such as butyric anhydride, succinic anhydride and glutaric anhydride can also be used provided that formation of a stable emulsion is effected before the fall in pH (which is relatively rapid with such substances) has proceeded too far. Of these substances referred to, lactide, both in its mesoform and as the racemic mixture, and delta-gluconolactone, are preferred.

If a fatty product is prepared by adding a further quantity of oil to the oil-in-water emulsion, it is preferred to add the acidogenic substance to said quantity of oil. The acidogenic substance does not decompose in this oil phase, so that the formation of acid does not start until the mixing with the oil-in-water emulsion. This generation of acid takes place slowly, since the oil phase only gradually surrenders the acidogenic substance to the aqueous phase. This gives time for the phase inversion to be effected before there is danger of coagulation of the protein by the acid formed.

The amount of acidogenic substance added and the nature of the acidogenic substance used govern the eventual pH of the product. In applying the process according to the invention care should be taken that the pH of the aqueous phase does not decrease to a value detrimental to the emulsifying properties of the protein until the emulsion has become stable.

The following examples illustrate the invention.

Example 1

40 g. of soyabean oil were dispersed in 60 g. of skimmed milk with 0.6 g. of meso-lactide. At 25° C. the pH decreased as follows:

| Time (in minutes): | pH |
|---|---|
| 0 | 6.0 |
| 15 | 5.5 |
| 30 | 5.1 |
| 60 | 4.8 |
| 120 | 4.4 |
| 180 | 4.4 |
| 240 | 4.3 |
| 300 | 4.2 |

Example 2

40 g. of soyabean oil were dispersed in 60 g. of skimmed milk with 0.9 g. of delta-gluconolactone. At 25° C. the pH decreased as follows:

| Time (in minutes): | pH |
|---|---|
| 0 | 6.0 |
| 15 | 5.6 |
| 30 | 5.4 |
| 60 | 5.2 |
| 120 | 5.0 |
| 180 | 4.8 |
| 240 | 4.5 |
| 300 | 4.4 |

Example 3

The aqueous phase with a pH of 7.0 to 7.2 was prepared from:

50 parts skimmed milk
0.5 part trisodium citrate bishydrate ($C_6H_5Na_3, 2H_2O$)
49.5 parts water.

In 35 parts of this aqueous phase at 40° C., 65 parts of a melted fat composition consisting of:

75 parts palm oil
25 parts palm kernel oil
0.5 part distilled monoglycerides of palmitic and stearic acids
0.005 part 20% dispersion of beta-carotene in edible oil were dispersed by means of a propeller stirrer and the resulting 65% oil-in-water emulsion was homogenised. This emulsion was cooled to 12° C. and thoroughly mixed with 75 parts of a pre-cooled fat composition consisting of:

42 parts soyabean oil
42 parts whale oil, hardened to a slip melting point of 35° C.
15 parts palm oil, hardened to a slip melting point of 45° C.
0.5 part distilled monoglycerides of palmitic and stearic acids
0.3 part soya lecithin
0.4 part racemic lactide
0.005 part 20% disperson of beta-carotene in edible oil.

The resulting mixture was cooled and plasticized in a closed cooling system.

The pH of the aqueous phase of the margarine prepared according to this example decreased from 7.0–7.2 to 4.6 within four hours.

In this way a margarine was obtained with good rheological properties and taste, while the microbiological keepability had the desired level because of the final acid reaction.

Example 4

An 80% oil-in-water emulsion was prepared by intimately mixing by means of a Turbo-stirrer 800 parts of a melted fat composition (at 70° C.) and 200 parts of aqueous phase at 10° C.

The fat phase was prepared from:

25 parts soyabean oil
30 parts palm oil
10 parts palm kernel oil
25 parts whale oil, hardened to a slip melting point of 35° C.
10 parts palm oil, hardened to a slip melting point of 45° C.
1 part distilled monoglycerides of palmitic and stearic acids
0.3 part soya lecithin
0.004 part 20% dispersion of beta-carotene in edible oil.

The aqueous phase was prepared from:

50 parts skimed milk
0.5 part trisodium citrate bishydrate ($C_6H_5Na_3, 2H_2O$)
49.5 parts water
1 part delta-lactone of gluconic acid.

The two phases in the ratio mentioned above were introduced by means of metering pump into a tank in which a predetermined amount (e.g. 2 kg.) of oil-in-water emulsion was present, and emulsified by means of a centrifugal stirrer. The prepared emulsion was continuously withdrawn at the same rate as the two phases were added (e.g. 70 kg./h.) The resulting emulsion was subsequently homogenised. The homogenised emulsion (at 40° C.) was immediately cooled at 18° C. by passage through a cooling coil immersed in ice-water. The phase inversion of the dispersion was substantially completed in a votator. Whereas the pH of the aqueous phase during emulsification was still above 6.5, the pH of the aqueous phase of the margarine decreased to 4.9 within four hours, owing to hydrolysis of the delta-lactone of D-gluconic acid.

The margarine obtained was satisfactory with regard to rheological properties, taste and microbiological keepability.

Example 5

A 50% oil-in-water emulsion was prepared by dispersing 50 parts of a melted fat composition in 50 parts of an aqueous phase at a temperature of 50° C. followed by homogenising the dispersion.

The fatty composition was prepared from:

20 parts sunflower oil
35 parts coconut oil
5 parts palm oil
30 parts whale oil, hardened to a slip melting point of 35° C.
10 parts palm oil, hardened to a slip melting point of 45° C.
1 part distilled monoglycerides of palmitic and stearic acids
0.3 part sorbic acid
0.004 part 20% dispersion of beta-carotene in edible oil.

The aqueous phase was prepared from:

10 parts spray-dried soya proteinate
1 part sodium chloride
89 parts water.

The pH of the aqueous phase was 7.0 to 7.4.

After homogenising the emulsion was cooled to 40° C. at which temperature 0.4 part (based on the emulsion) delta-lactone of D-gluconic acid was added as aqueous solution. The resulting mixture was immediately cooled and plasticised by passing it through a votator. During this passage phase inversion of the dispersion took place. The pH of the aqueous phase of the resulting product decreased to 4.8 within four hours, owing to the hydrolysis of the delta-lactone of D-gluconic acid. The resulting product although having a relatively low fat content showed a texture and spreadability similar to those of margarine. It showed a good microbiological keepability.

Example 6

A water-in-oil emulsion was prepared by injecting 48 parts of an aqueous phase having temperature of 22° C. into 52 parts of a precooled fat phase having a temperature of 9.7° C.

The fat phase was prepared from:

20 parts sunflower seed oil
35 parts coconut oil
5 parts palm oil
10 parts cottonseed oil, hardened to a slip melting point of 35° C.
20 parts sunflower seed oil, hardened to a slip melting point of 35° C.
10 parts whale oil, hardened to a slip melting point of 45° C.
1 part distilled monoglycerides of palmitic and stearic acids
0.3 part sorbic acid
0.5 part lactide
0.004 part 20% dispersion of beta-carotene in edible oil.

The aqueous phase was prepared from:

10 parts spray-dried soya proteinate
1 part sodium chloride
89 parts water.

The pH of the aqueous phase was 7.0 to 7.4.

The water-in-oil emulsion thus obtained was further cooled in a Votator A-unit and subsequently passed through a Votator B-unit.

The resulting product, although having a relatively low fat content, showed a texture and spreadability similar to those of margarine. It also showed a good palatibility and a good microbiological keepability. The pH of the aqueous phase of the product decreased to a final value of 5.0

What is claimed is:

1. In a method for preparing an emulsion comprising an oil phase, an aqueous phase, and a proteinaceous emulsifier, the improvement comprising the steps of (a) providing an aqueous phase having a pH sufficiently alkaline to prevent coagulation of the protein emulsifier and within a range which permits the emulsifier to function properly, (b) forming an emulsion and (c) thereafter acidifying the emulsion to not more than pH 5 by gradual release of an acid from an acidogenic substance contained in the emulsion.

2. In method for preparing a water-in-oil emulsion comprising an oil phase, an aqueous phase, and a proteinaceous emulsifier, the improvement comprising the steps of (a) providing an aqueous phase having pH sufficiently alkaline to prevent coagulation of the protein emulsifier and within a range which permits the emulsifier to function properly, (b) forming an oil-in-water emulsion, (c) cooling the oil-in-water emulsion to effect solidification of the components of the oil phase, (d) thereafter effecting inversion of the oil-in-water emulsion by mechanical working and (e) acidifying the inverted emulsion by gradual release of an acid from an acidogenic substance contained in the inverted emulsion.

3. A method in accordance with claim 1 wherein the acidogenic substance is a lactide.

4. A method in accordance with claim 1 wherein the acidogenic substance is delta-glucono-lactone.

5. A method in accordance with claim 2 wherein the acidogenic substance is contained in the oil phase.

6. A method in accordance with claim 2 wherein the aqueous phase includes skimmed milk to provide the proteinaceous emulsifier.

7. A method in accordance with claim 2 wherein the proteinaceous emulsifier is soya bean protein.

8. A method in accordance with claim 1 wherein the emulsion formed from step (b) is a water-in-oil emulsion obtained directly and without phase inversion.

9. A method in accordance with claim 8 wherein the acidogenic substance is a lactide contained in the oil phase.

10. A method in accordance with claim 8 wherein the acidogenic substance is a delta-glucono-lactone contained in the oil phase.

11. A method in accordance with claim 8 wherein the aqueous phase includes skimmed milk to provide the proteinaceous emulsifier.

12. A method in accordance with claim 8 wherein the proteinaceous emulsifier is soya bean protein.

References Cited

UNITED STATES PATENTS

| 2,819,169 | 1/1958 | Boldingh et al. | 99—123 |
| 2,982,654 | 5/1961 | Hammond et al. | 99—116 |

FOREIGN PATENTS 586,782  11/1959  Canada.

MAURICE W. GREENSTEIN, *Primary Examiner.*

UNITED STATES PATENT OFFICE
CERTIFICATE OF CORRECTION

Patent No. 3,386,835

June 4, 1968

Jacob Arie Schaap

It is certified that error appears in the above identified patent and that said Letters Patent are hereby corrected as shown below:

Column 3, lines 5 and 62, "$(C_6H_5Na_3, 2H_2O)$" should read -- $(C_6H_5O_7Na_3, 2H_2O)$ --.

Signed and sealed this 18th day of November 1969.

(SEAL)
Attest:

Edward M. Fletcher, Jr.
Attesting Officer

WILLIAM E. SCHUYLER, JR.
Commissioner of Patents